UNITED STATES PATENT OFFICE.

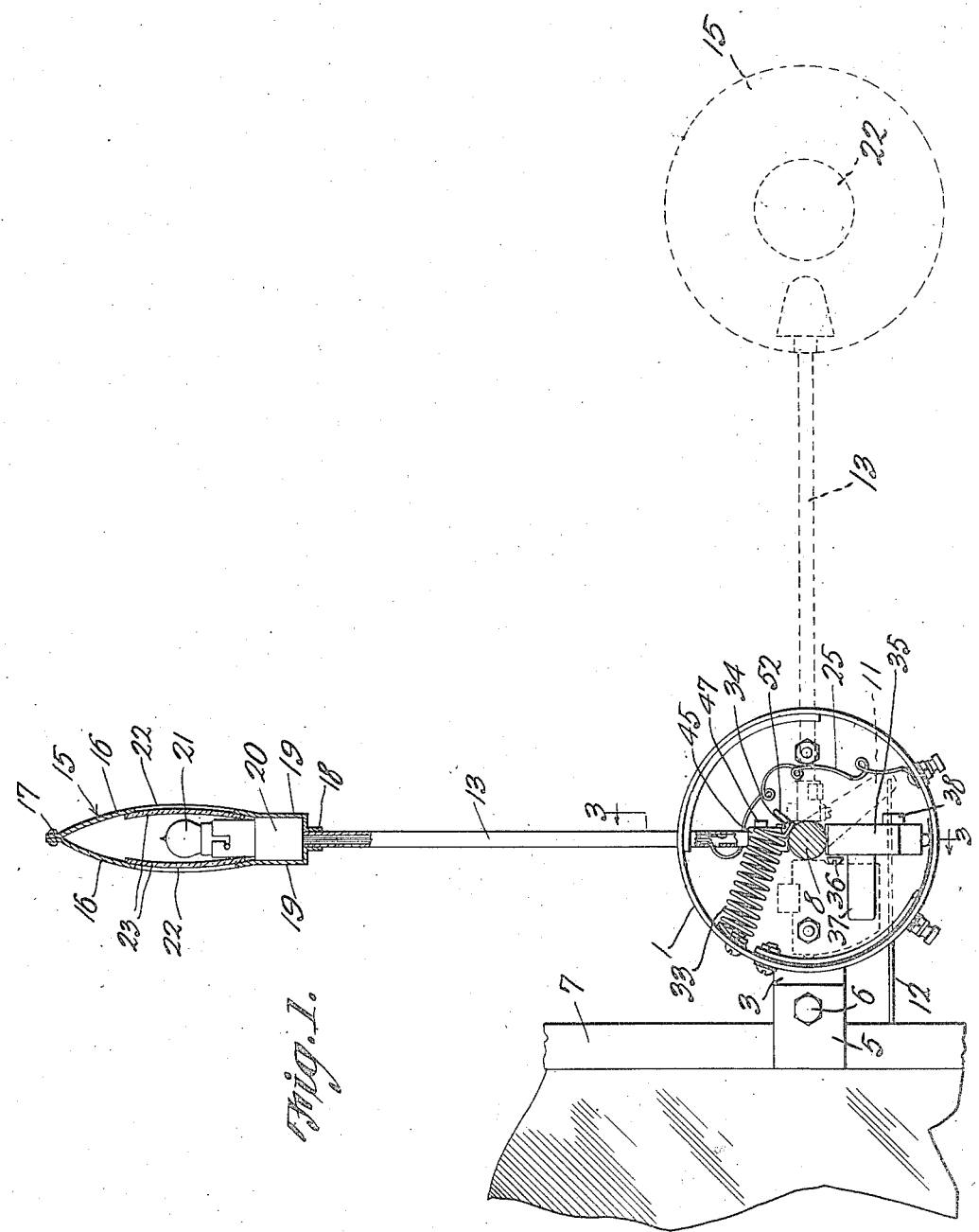

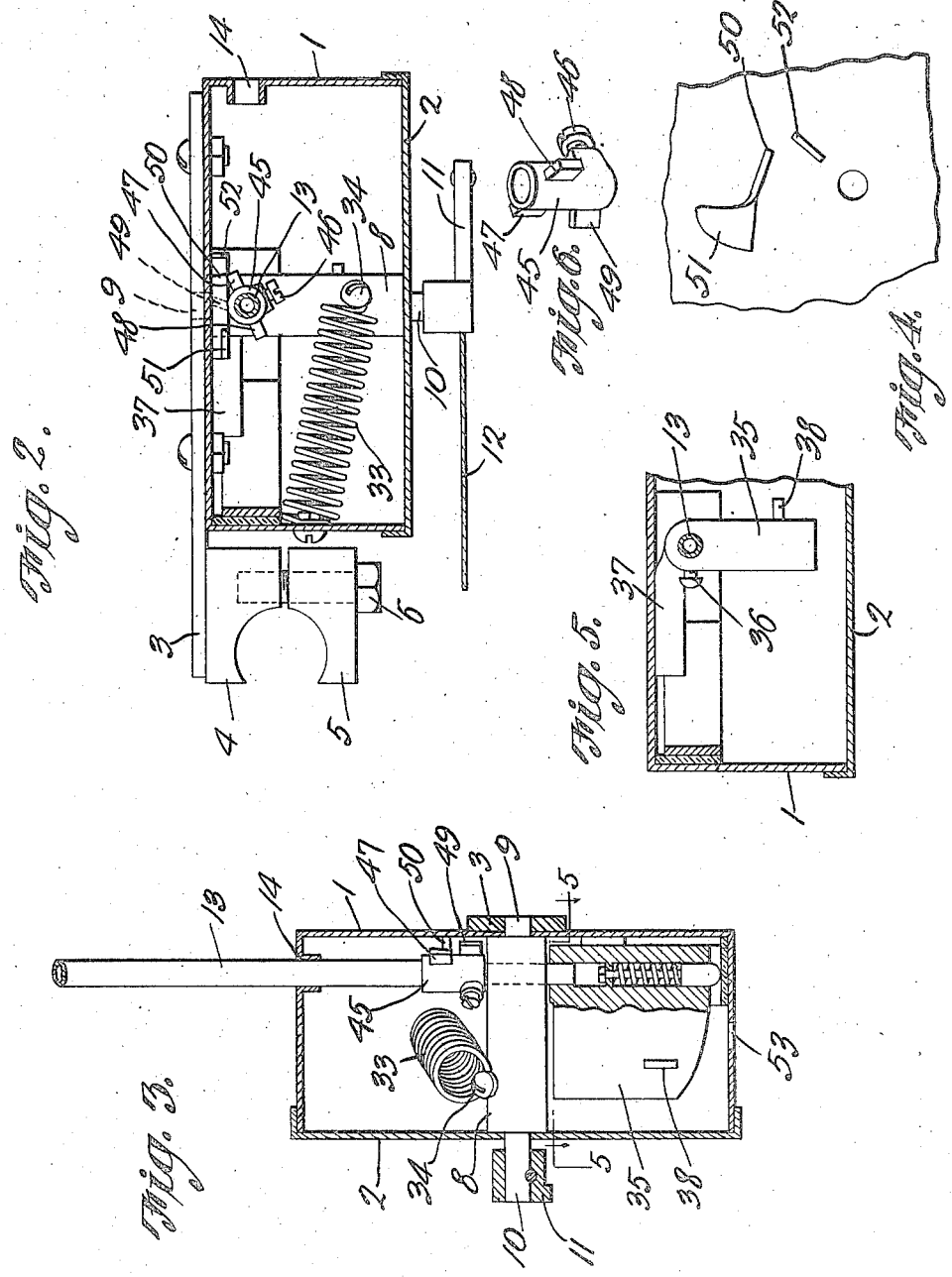

OLIVER GEORGE DEATS, OF AUSTIN, TEXAS.

AUTOMOBILE-SIGNAL.

1,247,797.  Specification of Letters Patent.  Patented Nov. 27, 1917.

Application filed August 19, 1916. Serial No. 115,827.

*To all whom it may concern:*

Be it known that I, OLIVER G. DEATS, a citizen of the United States, residing at Austin, in the county of Travis and State of Texas, have invented a new and useful Automobile-Signal, of which the following is a specification.

The present invention appertains to signals and semaphores, and aims to provide a novel and improved signal adapted for use upon automobiles and other vehicles for facilitating traffic and to avoid confusion and collision at crossings and elsewhere.

It is the object of the invention to provide a signal of the nature indicated including a signal arm controlled in a novel manner and movable from one position to another, the signal arm being inoperative in one position, and when moved to the other position being visible to other vehicles and pedestrians both in front and in rear, to warn them of the intention of the operator or driver to turn.

A further object of the invention is to provide a signal arm mounted for swinging movement and carrying a relatively flat signal head mounted for turning movement about the axis of the signal arm, and novel means whereby when the signal arm is in inoperative position, the signal head will be disposed in a plane longitudinally of the vehicle so as to be invisible from the front and rear and in order not to face the wind, and when the signal arm is swung to operative position, the signal head is turned into a substantially transverse plane so as to face forwardly and rearwardly to be readily observed.

It is also the object of the invention to provide a device of the nature indicated which is comparatively simple, compact and inexpensive in construction, which can be applied to various vehicles in an easy and convenient manner, which has improved features of construction to enhance the utility and efficiency thereof, and which serves its office in a thoroughly practical and serviceable manner.

With the foregoing and other objects in view which will appear as the description proceeds, the invention resides in the combination and arrangement of parts and in the details of construction, hereinafter described and claimed, it being understood that changes in the precise embodiment of the invention, herein disclosed, can be made within the scope of what is claimed, without departing from the spirit of the invention.

The invention is illustrated in the accompanying drawings, wherein:—

Figure 1 is a front view of the signal, portions being removed and shown in section, and the signal arm being illustrated in normal inoperative position in full lines and in operative or signaling position in dotted lines.

Fig. 2 is a plan view of the device, the casing and other portions being shown in section.

Fig. 3 is an enlarged vertical section taken on the line 3—3 of Fig. 1, portions being illustrated in elevation.

Fig. 4 is a detail view of the casing illustrating the stop lugs thereof.

Fig. 5 is a sectional detail taken on the line 5—5 of Fig. 3.

Fig. 6 is a perspective view of the tappet collar.

In carrying out the invention, there is provided a cylindrical casing having its axis substantially horizontal and longitudinally of the vehicle, and comprising a cup-shaped section 1 and a cap-shaped section or cover plate 2 fitted upon the rim of the section 1 to close the same. The casing can be attached to the automobile or other vehicle in any suitable manner, and as a convenient means for accomplishing this, a horizontal bar 3 is secured in any suitable manner to the back of the rear section 1 of the casing, diametrically thereof, and one end of the bar projects from the casing and has a clamp section 4 secured thereto at one side of the casing. A second clamp section 5 coöperates with the clamp section 4, and is connected thereto by a clamp bolt 6, and said clamp sections 4—5 are adapted to embrace a post 7 of the wind shield or other upright of the vehicle, whereby to support the casing at one side of the vehicle, it being understood that one of the devices can be used at each side. It is also possible to attach the casing in various manners, and to arrange the casing in various positions.

Mounted for oscillation within the casing axially thereof, is a rock shaft 8 having a reduced terminal or trunnion 9 mounted for rotation through the center of the casing section 1 and the bar 3, and said shaft has a remote reduced terminal or trunnion 10 journaled for rotation through the casing section or cover plate 2. An arm 11 is secured in any suitable manner to the terminal 10, for oscillating the shaft 8, and can be operated in any suitable manner by the operator or driver of the vehicle, such as by means of a cord or cable 12 connected to said arm, and adapted to be pulled for turning the shaft 8 in one direction.

The signal arm 13 is tubular and is disposed radially of the casing, the casing being provided with an arcuate slot 14 in its periphery through which the arm extends, and said arm is journaled for rotation through the shaft 8, so that the arm will be swung with the shaft, but can turn or rotate about its axis. The outer end of the signal arm 13 carries the relatively flat or disk-shaped signal head or member 15, which is composed of opposed complementing dished disks 16 having their concaved sides facing one another to provide a chamber therebetween, and having their edges secured together, as at 17. The head 15 is provided at its inner edge with a collar 18 secured upon the outer end of the arm 13, and the disks 16 are provided adjacent the collar or attaching means 18 with outstruck portions 19 providing a receptacle or seat for a lamp socket 20 carrying an electric lamp 21 arranged centrally within the head 15. The disks 16 are provided with openings 22 at the opposite sides of the lamp 21, and panels 23 of celluloid or other transparent material are secured to the inner surfaces of the disks 16 and extend across the openings 22, being colored red, or other appropriate color, while the remainder of the head 15 and the signal arm and casing can be given any suitable color.

When the arm 11 is pulled by the cord or cable 12, the signal arm 13 which normally projects upwardly when in inoperative position, will be swung outwardly and downwardly to outstanding horizontal position, as seen in dotted lines in Fig. 1, and as a means for returning the signal from lowered signaling position to raised inoperative position, a coiled wire retractile spring 33 is disposed within the casing, having one end bolted or otherwise secured to the periphery of the casing and having its other end fastened, as at 34, to the rock shaft 8, in order that said spring will rotate the shaft 8 in a direction to raise the signal arm after it has been lowered and when the cord 12 is slackened.

A weight 35 is disposed at that side of the shaft 8 opposite the signal arm, and is fitted upon the inner terminal of the arm 13, which protrudes from the shaft 8, being secured to said terminal by means of a set screw 36, or the like. The weight 35 extends to one side radially from the axis of the arm 13 and in a plane in which the axis of said arm is located, whereby the weight 35 is in the form of a wing. When the arm 13 is in raised position, the weight 35 is disposed longitudinally of the casing or in a plane in which the axis of the casing is located, the arm 13 being located adjacent to the back of the casing and the weight 35 projecting forwardly toward the front or cover plate 2, as seen in Fig. 3. The weight 35 is provided at one side with a stop lug 37 projecting therefrom at an angle to contact with the back of the casing when the parts are in normal position, and the weight is provided at its opposite side with an outstanding stop lug 38 to contact with the back of the casing when the weight is moved due to the movement of the signal arm to signaling position.

As a means for turning the arm 13 when said arm is oscillated with the shaft 8, a collar 45 is fitted upon the arm 13 adjacent to the shaft 8 and is secured to said arm by means of a set screw 46 or otherwise. The collar 45 and weight 35 being disposed at opposite sides of the shaft 8 will hold the signal arm 13 in position relative to said shaft, permitting the signal arm to rotate about its axis. The collar 45 is provided adjacent to its outer end with diametrically opposite outstanding lugs 47 and 48, and adjacent to its inner end with an outstanding lug 49 arranged at an angle with the lugs 47 and 48. The lugs 47 and 49 provide tappets for turning the signal arm about its axis. The back of the casing has inwardly projecting stop lugs 50, 51 and 52 for the coöperation of the respective lugs 47, 48 and 49 of the collar 45. The coöperating lugs are so arranged as to properly operate and control the signal arm.

Normally, when the cord 12 is slackened, the signal arm will be held in upstanding inoperative position by the spring 33 which rotates the shaft 8 to swing the signal arm to the upper end of the slot 14. The tappet lug 47 bears against the lug 50 of the casing, to hold the signal arm 13 with the signal head 15 in a vertical plane longitudinally of the vehicle, whereby the signal head is practically invisible from the front and rear, and is disposed with its edge to the wind whereby to cut the air. Now, when the cord 12 is pulled to swing the arm 11 whereby to turn the shaft 8, the arm 13 is swung outwardly and downwardly to signaling position, as seen in dotted lines in Fig. 1, and at the same time, the arm 13 is rotated about its axis to bring the signal head into a transverse vertical plane. Thus, during the downward swinging movement of the arm 13, the lug 47 rides off of the lug 50, before the lug 49 reaches the lug 52, and the lug 49 is so arranged, that when it contacts with the lug 52, the lug 49 is stopped, and the arm 13 in continuing its movement, will result in the arm 13 being rotated about its axis due to the wiping action of the lug 49 against the lug 52, said lug 49 being rotated about the axis of the arm 13. It will be noted that when the arm 13 is swung downwardly, the weight 35 will be raised, and the turning motion of the arm 13 about its axis will swing the weight 35 downwardly and rearwardly toward the back of the casing, the lug 38 in striking the back of the casing limiting such movement of the weight. The downward swinging movement of the weight 35 facilitates the turning movement of the signal arm 13 about its axis, in connection with the engagement of the lug 49 with the lug 52, the signal head 15 will therefore be disposed in a vertical transverse plane so as to be visible from both the front and rear, and the signal arm will project outwardly from one side of the automobile toward which side it is the intention of the operator to turn. In this connection, it is to be understood that one of the devices can be used upon each side of the machine, in order that the two devices can be operated for indicating the intention of the operator to steer to one side or the other, and both devices can be operated simultaneously to swing the signal arms to signaling position, which will indicate the intention of the operator to stop.

After the turn has been made, the signal arm is returned to inoperative position, by releasing the cord 12, so that the spring 33 rotates the shaft 8 to swing the arm 13 upwardly. During the upward movement of the arm 13, the tappet lug 49 is first removed from the stop plug 52, and the tappet lug 47 is so arranged that it strikes the lug 50, thereby retarding the lug 47 and said lug 47 will be drawn onto the lug 50 as the arm 13 reaches its vertical position, whereby the movement of the arm 13 after the lug 47 strikes the lug 50 will turn the arm 13 about its axis through an angle of about 90°, whereby to return the signal head 15 to the longitudinal vertical plane. The lug 48 is adapted to contact with the stop lug 51 should the arm 13 rotate about its axis an excessive amount, to thereby limit such rotation of the arm, and as the arm 13 goes back to normal position, the weight 35 is swung forwardly away from the back of the casing, the stop lug 37 striking the back of the casing to limit the movement of the weight and the signal arm. The weight 35 counterbalances the signal arm and signal head 15 in order that they will swing easier, and the weight also assists in the turning movement of the signal arm about its axis when the same is lowered. Even though the weight has an oscillatory or swinging movement both with the shaft 8 and about the axis of the arm 13 which is at right angles with the shaft 8, the contact 40 which is disposed in the axis of the arm 13 will be carried for sliding movement in an arcuate line.

With the present construction, the signal head or member 15 has a double turning movement, one about the pivotal point or shaft 8 of the arm 13, and the other about the axis of said arm, in order that the signal head when moved from one position to another will be turned from a longitudinal into a transverse plane, and vice versa. When the signal arm is lowered, the weight 35 is in a depending position, thereby to maintain the signal head 15 in vertical position, the stop lug 37 being immediately below the spring 33 to prevent the weight 35 from swinging forwardly, while the stop lug 38 of the weight prevents it from swinging rearwardly.

It is preferable to provide the casing with a drain aperture 53 at its lowermost point, whereby any water which enters the casing will drain out.

Having thus described the invention, what is claimed as new is:—

1. A signal device embodying a member mounted to oscillate about an axis, a signal arm carried by said member for oscillation about another axis at an angle with the first mentioned axis and extending to one side, a weight carried by said arm extending to one side thereof to turn the signal arm about the second mentioned axis when said member is turned about the first mentioned axis to one position and tending to swing the signal arm and member about the first mentioned axis to another position, and means for turning the signal arm about the second mentioned axis in the opposite direction when said arm is moved to the second mentioned position.

2. A signal device embodying a member mounted to oscillate about an axis, a signal arm carried by said member for oscillation about another axis at an angle with the aforesaid axis and extending to one side, means for oscillating said member about the first mentioned axis, a pair of tappet lugs carried by said arm and extending therefrom, and means in the path of said lugs for turning said arm about the second mentioned axis when said member is oscillated to move the arm to extreme positions.

3. A signal device embodying a member mounted for oscillation about an axis, means for oscillating said member, a signal arm carried by said member for oscillation about an axis at an angle with the first mentioned axis, a weight carried by said arm and extending to one side thereof, in order to tend to swing said arm about the second mentioned axis when the arm is in one position, said weight also tending to swing the arm and member to another position, tappet lugs carried by said arm, and means in the path of said lugs for turning the arm about the second mentioned axis when the arm is swung to extreme positions.

In testimony that I claim the foregoing as my own, I have hereto affixed my signature in the presence of two witnesses.

OLIVER GEORGE DEATS.

Witnesses:
C. A. GLASS,
C. C. CAMPBELL.